No. 712,470. Patented Nov. 4, 1902.
S. ALLCOCK.
SPOON BAIT.
(Application filed Jan. 11, 1902.)
(No Model.)
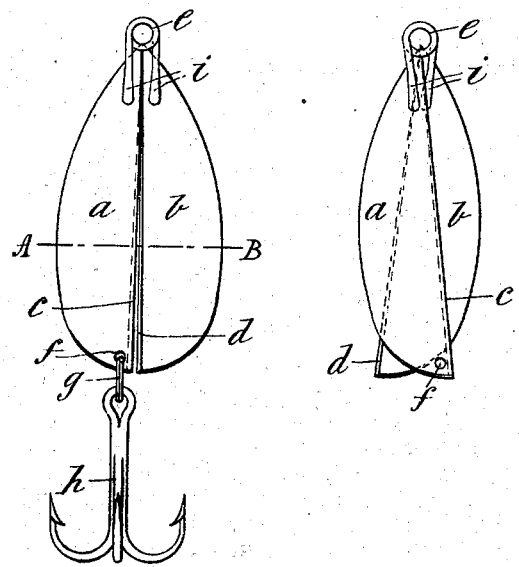

UNITED STATES PATENT OFFICE.

SAMUEL ALLCOCK, OF REDDITCH, ENGLAND.

SPOON-BAIT.

SPECIFICATION forming part of Letters Patent No. 712,470, dated November 4, 1902.

Application filed January 11, 1902. Serial No. 89,333. (No model.)

*To all whom it may concern:*

Be it known that I, SAMUEL ALLCOCK, a subject of the King of Great Britain, trading as S. Allcock & Co., residing at Standard Works, Redditch, in the county of Worcester, England, have invented a new and useful Improved Spoon-Bait for Fishing Purposes, of which the following is a specification.
This invention relates to spoon-baits for fishing purposes; and its object is to produce a spoon-bait that will collapse when seized by a fish, and therefore would lessen the obstacle to the hooks catching the fish. The spoon-bait in this invention can be of metal or other suitable material. When the spoon is seized by a fish, the strips of metal overlap each other—in other words, the spoon will collapse; but when the pressure is removed the bait resumes its original spoon shape. I attain these objects by the mechanism illustrated in the accompanying drawings, in which—

Figure 1 is an elevation of the spoon-bait with two strips held together by a spring-eyelet. Fig. 2 is an elevation of the spoon-bait with the strips of metal overlapping each other, as it would appear when seized by a fish. Fig. 3 is a section on line A B of Fig. 1.
For example, I construct a spoon-bait of two strips *a* and *b*, of metal or of any other material, cut in the center lengthwise, the parts *c* and *d* being splayed off in order that the strip *a* shall readily overlap the strip *b* when the bait is seized by a fish, as in Fig. 2. The aforesaid two strips *a* and *b* are stamped spoon shape and held together by a spring-eyelet *e*, having its ends *i* flattened and soldered or riveted to each strip. A hole *f* is drilled at the end of the strip *a* in order to receive a ring *g* and hook *h*.

What I claim as my invention, and desire to secure by Letters Patent, is—

1. In a spoon-bait, the combination of two spoon-shaped members having straight splayed edges which normally extend substantially parallel to each other, a coiled spring bearing arms which are secured to said spoon-shaped members, and a fish-hook carried by one of said spoon-shaped members, said hook being arranged to operate said members to overlap each other when force is applied to said hook, substantially as described.

2. In a spoon-bait, the combination of two members having straight oppositely-splayed edges located adjacent to each other, a spring connected to said members and arranged to hold them with the said splayed edges substantially parallel, and a hook connected to one of said members, and arranged to operate said members to overlap each other when force is applied to said hook, substantially as described.

3. In a spoon-bait, a spoon composed of a plurality of sections normally extending substantially parallel, a spring attached to said members and arranged to hold them in their normal positions, and a hook attached to one of said members and arranged to operate said members to overlap each other to decrease the size of the said spoon when force is applied to the said hook, substantially as described.

SAMUEL ALLCOCK.

Witnesses:
A. E. OCKFORD,
R. F. WARDLE.